Sept. 24, 1968  P. F. HILL  3,402,430
MOLD APPARATUS FOR FORMING A SAFETY PIN WITH PLASTIC ENDS
Filed July 19, 1965  4 Sheets-Sheet 1
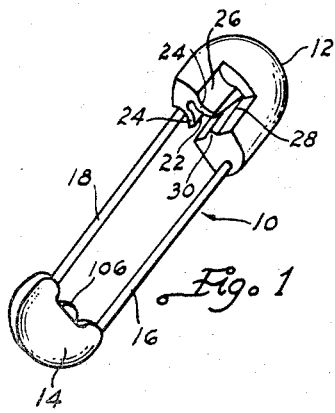
Fig. 1
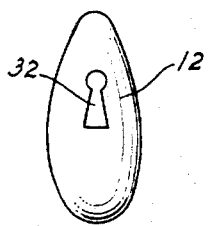
Fig. 1a
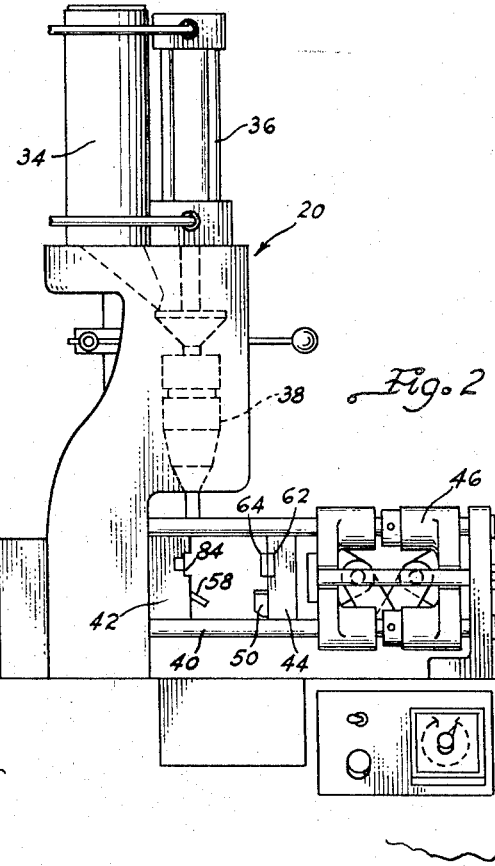
Fig. 2
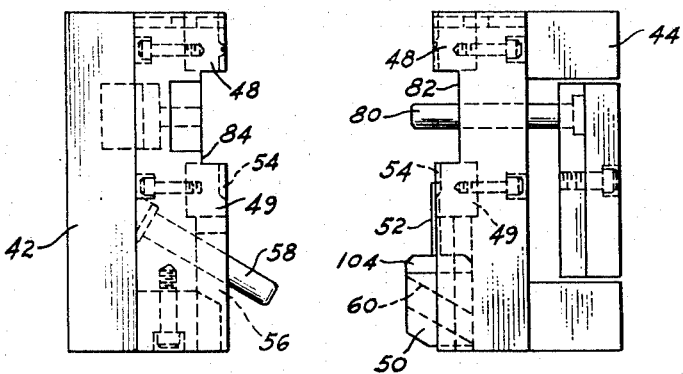
Fig. 3
Fig. 4
INVENTOR.
PIERRE F. HILL
BY
ATTORNEY Sept. 24, 1968    P. F. HILL    3,402,430

MOLD APPARATUS FOR FORMING A SAFETY PIN WITH PLASTIC ENDS

Filed July 19, 1965    4 Sheets-Sheet 3

INVENTOR.
PIERRE F. HILL

BY

ATTORNEY

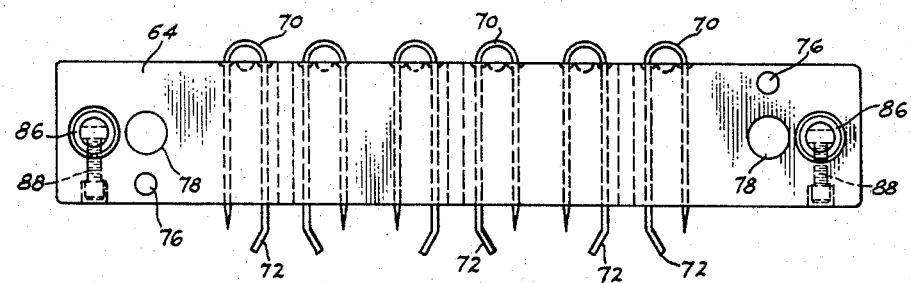
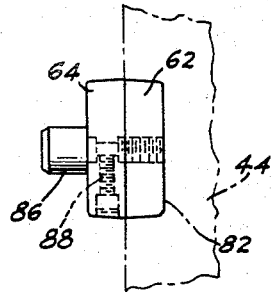
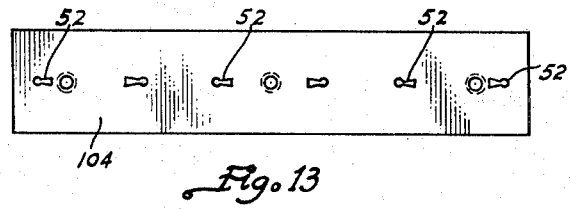
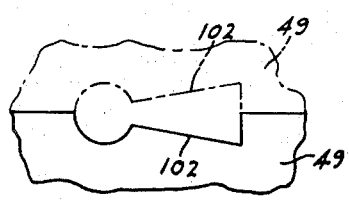
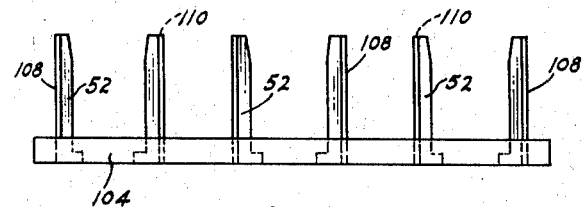
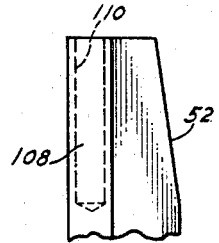
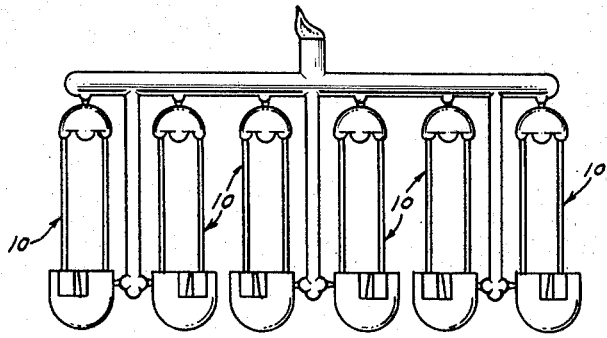

United States Patent Office 3,402,430
Patented Sept. 24, 1968

3,402,430
MOLD APPARATUS FOR FORMING A SAFETY
PIN WITH PLASTIC ENDS
Pierre F. Hill, York, Pa., assignor to Korbond Industries
Pty. Limited, Peakhurst, New South Wales, Australia,
a corporation of Australia
Filed July 19, 1965, Ser. No. 472,891
8 Claims. (Cl. 18—36)

This invention pertains to a molding apparatus for forming a safety pin of the type generally described in U.S. Patent No. 3,052,938, granted Sept. 11, 1962, to Hill et al., one of which patentees now has developed the instant invention for purposes of forming such safety pin.

For purposes of facilitating the manufacture of such pins, the design thereof has been departed from at least as to certain details, while preserving the basic advantages and principles of the pin covered by said patent. Accordingly, the pin manufactured by the apparatus comprising the subject matter of the present application is of the self-closing type so as normally never to expose the pointed end of the pin leg of the safety pin when the pin is in repose, whereby it is necessary to positively move the pin leg away from the head of the pin when it is desired to insert the same into items to be pinned together by said pin. Also, the head of the pin includes a channel which is arranged to receive the pointed end of the pin leg when the pin is disposed in fully latched condition and, more importantly, a flared mouth has been provided for the channel which ultimately receives the pointed end of the pin leg and leads to a constricted throat through which the pointed end may releasably be snapped into final locked position within the innermost portion of the channel.

Molding a head for a safety pin from suitable plastic material, preferably by an injection process, upon the end of the back leg of the basic U-shaped pin unit of a safety pin has presented many problems, particularly to produce a safety pin of the type which automatically closes safely, as described above. However, the problem now has been solved in a highly satisfactory way by providing mold members which have complementary cavity portions therein which cooperate to form the exterior surfaces of the head of such pin and, in order to form the channel in said head, a mold insert has been devised which extends into the mold cavity prior to the injection of the plastic and shields the pointed end of the pin leg by actually enclosing the same, the insert also providing means for forming the flared entrance mouth and constricted throat for the channel in the head, through which throat the pointed end of the pin is snapped into fully locked position within the head.

It is the principal object of the invention therefore, to provide such insert means as referred to above in conjunction with suitable construction for the mold members and also means for holding the legs of the U-shaped pin units operatively so that ends of said legs are exposed and are enclosed within the mold cavity for the head of the pin, whereby the plastic to form the head may be injected into the mold cavity and firmly unite with said projecting end of the back leg of the pin and form the molded head, while the pointed end of the pin leg is shielded from contact by the plastic material and thereby additionally results in the benefit of the pin being formed in completely latched condition when discharged from the mold. As a result of this, no additional manual operations, other than to sever the gates from the pin, are necessary in order to form a completed safety pin in which the pointed end of the pin is completely latched within the head.

Another object of the invention is to so devise the means for holding the U-shaped metallic pin members, while having a head molded onto the end of the back leg thereof and a reinforcing end member onto the bight portion of the U-shaped members, that said holding means preferably form one portion of the walls of the molding cavities for the heads and reinforcing end members of the pins and, in addition, said holding means also are provided with cooperating grooves to provide runners within the overall mold assembly.

A still further object of the invention is to provide means within the mold construction for automatically projecting and retracting the insert members for shielding the pointed ends of the pin legs incident to closing and opening the mold.

Details of the foregoing objects and of the invention, as well as other objects thereof, are set forth in the following specification and illustrated in the accompanying drawings comprising a part thereof.

In the drawings:

FIG. 1 is a perspective view of a preferred construction of safety pin capable of being formed by the present invention to the extent of having the head and reinforcing end member respectively molded from plastic material onto the opposite ends thereof, the pointed end of the pin being shown in this view as removed from the inner locking channel of the head.

FIG. 1a is a view of the outer end of the head of the pin shown in FIG. 1.

FIG. 2 is a side elevation of a typical molding press of the injection type in which the mold apparatus comprising the essence of the present invention is mounted for operation, a portion of the base of the molding press being omitted to facilitate positioning the same on the sheet.

FIGS. 3 and 4 respectively are cooperating mold members per se, illustrated on a larger scale than in FIG. 2, but being of the type used in said molding press shown in FIG. 2 and embodying the principles of the invention.

Figure 5:
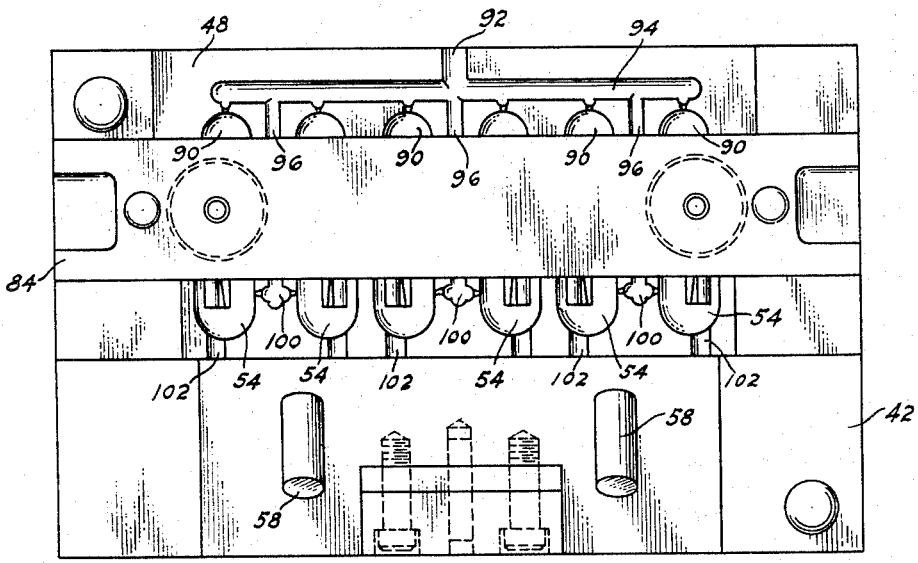
Figure 6:
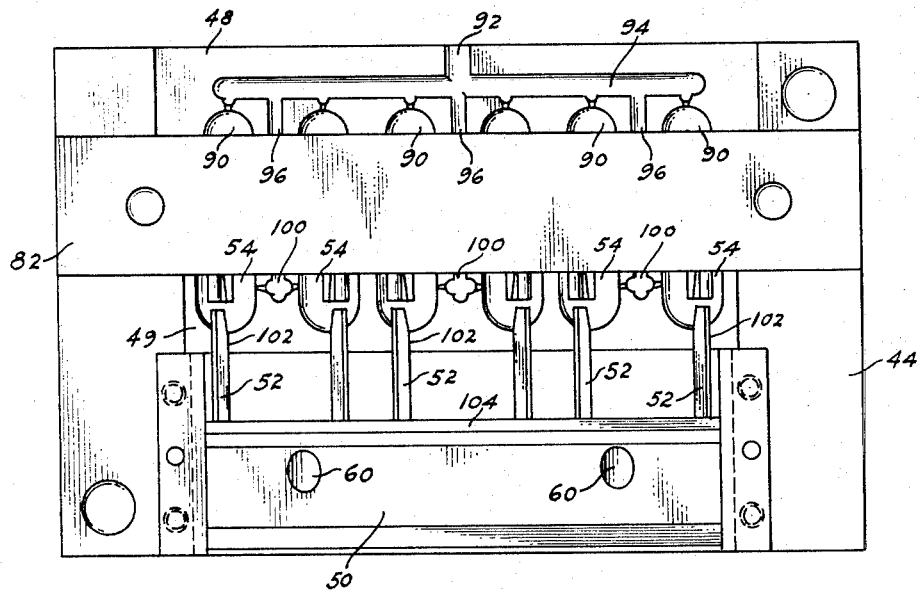

FIGS. 5 and 6 respectively are face views of the mold members per se respectively shown in FIGS. 3 and 4 and being illustrated on a still larger scale than in the latter figures.

Figure 7:
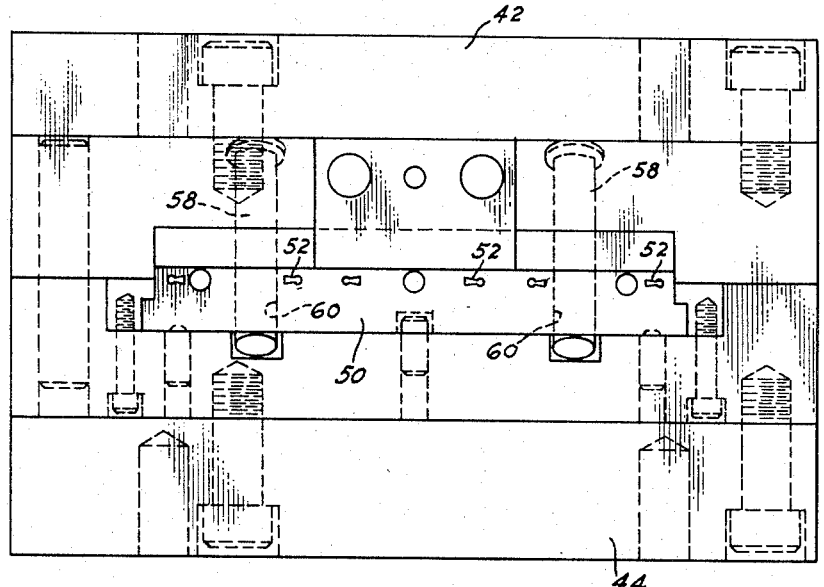

FIG. 7 is a bottom plan view of the mold members shown in FIGS. 5 and 6 when the same are closed against each other to form the mold cavities.

Figure 8:
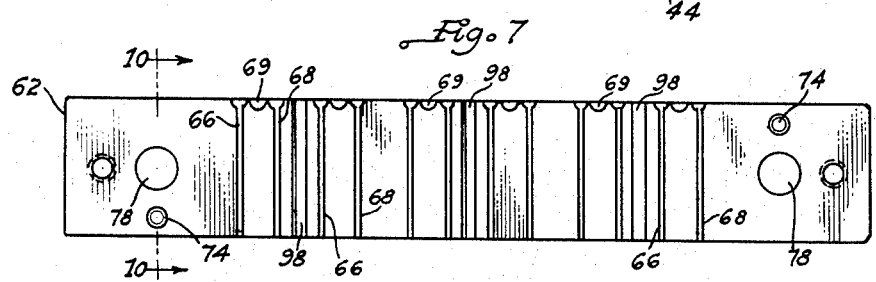
Figure 9:
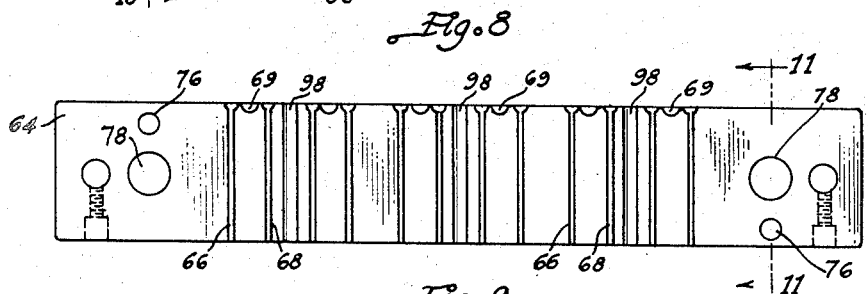

FIGS. 8 and 9 respectively are face views of bar-type holding means for supporting a plurality of U-shaped basic pin units in operative position between the mold members so as to have the ends of the U-shaped pin units projecting from one end of said holding means and the bight portions projecting from the opposite end thereof when said members are positioned in clamping arrangement against opposite sides of the pin units.

Figures 10, 11:
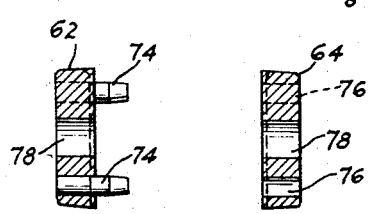

FIGS. 10 and 11 are end views of the holding means respectively shown in FIGS. 8 and 9.

FIG. 12 is a side elevation of the holding means shown in FIGS. 8–11 when assembled in clamping engagement with a plurality of U-shaped pin units and illustrating the manner in which the ends of the legs of said units project beyond one edge of the holding means.

FIG. 13 is a plan view of the bar-like member for directly supporting the mold inserts which are projectable into the mold cavities to shield the pointed ends of the pin units.

FIG. 14 is a side elevation of the supporting member and inserts illustrated in FIG. 13.

FIG. 15 is a fragmentary detail of means for securing the holding members of FIGS. 8–12 in clamping engagement.

FIG. 16 is a fragmentary view, partly in phantom, showing the shape of openings in one end of the mold cavities for forming the heads of the pins and through which openings the mold inserts for shielding the pointed ends of the pins are moved.

FIG. 16a is an enlarged, fragmentary elevation of the outer end of one of the mold inserts.

FIG. 17 is a plan view of a completely molded cluster of unseparated, completely molded pins, runners, and gates, as removed from the mold and clearly showing the minimum amount of gate-severing, finishing operations required to produce a finished safety pin in accordance with the principles of the invention.

Referring to the drawings and especially FIG. 1, the pin 10, which is of the preferred design for being manufactured by the mold apparatus and method comprising the present invention, is illustrated as having a molded head 12 formed on one end thereof and a reinforcing end member 14 molded on the bight portion of the U-shaped pin unit comprising back leg 16 and pointed pin leg 18, the pointed end of leg 18 being hidden behind the head 12 in said view. Though a U-shaped bight portion is shown, it is to be understood the invention is capable of application to a safety pin having a limited coil at the bight portion. The head 12 and member 14 are molded, preferably by the injection molding press 20, shown in FIG. 2, from thermoplastic synthetic resin of suitable type, details of the composition of which are not important to the present invention. In general however, it is preferred that the plastic selected be of a relatively rigid but resilient type.

From FIG. 1, it will be seen that the head 12 of the pin is provided with a channel 22 which extends from the inner end of the head 12 toward the outer end thereof a limited distance. It also will be seen that the opposite side walls defining said channel are flared outwardly, toward the back leg 16, with respect to each other and the inner ends of said flared walls define constricting members or ridges 24 which are spaced apart slightly less than the diameter of the portion of the pointed end of the pin leg 18 which is to be snapped therebetween into the upper extremity of the channel, as viewed in FIG. 1, wherein the pointed end then is disposed in fully latched condition. However, the U-shaped pin unit comprising the connected legs 16 and 18 is so formed that, in repose, the legs are substantially parallel to each other, whereby when the pin is in repose, as clearly stated in the aforementioned prior patent directed specifically to said pin, the pointed end of the pin leg 18 will naturally and automatically be received within one of the elongated concavities 26 which are disposed on opposite sides of the head outwardly of the channel 22.

When disposed in such concavities 26, the pin is in safe condition. However, the pointed end of pin leg 18 may readily be received within the channel and fully latched by slightly manipulating the pointed end to snap it past the constricting members 24. It also will be seen that there is a transverse passage 28 extending completely through the head, between opposite sides thereof, and a camming ridge 30 also is provided on the head 12 intermediately of the ends of the passage 28 to assist in camming the pointed end of the pin upward into channel 22 when it is desired to fully latch the pin in said channel.

One of the principal difficulties encountered in designing a mold to form particularly the head 12 upon the outer end of the pin legs 16 and 18 was devising a suitable means to form the channel 22. Various types of inserts and other expedients proved ineffective. Certain types of small, molded plastic inserts were devised for cemented union with separately molded head members but these were discarded because of the excessive fabricating time required and molding procedures and cementing techniques which were found to be necessary by following such procedures.

The problem now has been solved in a highly satisfactory manner however by utilizing a mold insert which forms in the outer end of the head 12, as seen in FIG. 1a, an opening 32 which, in cross-section, is key-hole shaped and extends entirely through the head 12 to merge with and actually form the channel 22. Details of the means for forming the key-hole shaped opening 32 are described hereinafter.

Referring to FIG. 2, in which a typical injection type molding press 20 is illustrated, it will be seen that the same includes a container 34 to hold the plastic material in comminuted form, the injection ram 36, the heating compartment 38, and the molding head 40. It is primarily with the molding head 40 that the present invention is concerned. Said head supports a stationary mold member 42 and the complementary, movable mold member 44, the latter being reciprocated by a conventional mechanism 46.

Referring to FIGS. 3 and 4, wherein the stationary and movable mold members 42 and 44 respectively are shown, it will be seen that there are detachable mold blocks 48 and 49 which actually contain the mold cavities which are complementary to each other and similar cavities are formed in the mold blocks respectively carried by the members 42 and 44. Mold member 44 also carries a vertically movable supporting member 50, as viewed in FIG. 4, the same having a plurality of mold inserts 52 fixed relative thereto and projecting upwardly therefrom so as to be extendible into the mold cavities 54 which form the head 12 of the safety pin when the molds are arranged for injection of plastic material thereinto.

In FIG. 3, it will be seen that the mold member 42 also is provided with a recess 56 which closely and slidably receives the projecting portion of the supporting member 50 which extends beyond the left-hand face of the mold member 44 shown in FIG. 4. Further, mold member 42 is provided with a pair of downwardly extending cam pins 58 which slidably engage correspondingly angularly extending cam holes 60 formed in the supporting member 50. As seen in FIG. 7, the pins 58 and holes 60 preferably are disposed in substantially spaced relationship to each other adjacent opposite ends of the mold members. Also, as is apparent from FIGS. 3 and 4, when the mold member 44 is moved into closed relationship against mold member 42 by the operation of mechanism 46, the outer ends of the cam pins 58 will engage the outer ends of cam holes 60 in the supporting member 50 and continued closing movement results in corresponding elevation of supporting member 50 to project the outer ends of the mold inserts 52 fully into the mold cavities 54 which form the heads 12 of the pins.

Another important contribution to solving the problem of molding the heads 12 satisfactorily upon the ends of the U-shaped pin units comprises the clamping or supporting bar members 62 and 64, the inner faces of which are shown respectively in FIGS. 8 and 9. In these figures it will be seen that said inner faces contain complementary pairs of clamping grooves 66 and 68, the depths of which are preferably only slightly less than half the diameter of the legs 16 and 18 of the pin 10. Corresponding side edges of the clamping bars 62 and 64 also have appropriate partial mold cavities 69 which cooperate with other cavities, to be described, for molding the reinforcing end members 14 on the pins 10. The manner in which the clamping bars 62 and 64 clamp a full compliment of U-shaped pin units 70 therebetween is illustrated in FIG. 12.

To facilitate molding the heads upon the pin units and especially for gating the mold cavities for the injection of plastic material to form the heads, the ends 72 of the back legs 16 are disposed adjacent each other with respect to adjacent pairs of the units 70, as will be described hereinafter. To facilitate connecting the clamping bars 62 and 64 in clamped relationship, the bar 62 is provided in opposite diagonal corners of the end portions thereof with guide pins 74, the same being received in complementary guide pin holes 76 in clamping bar 64. The opposite ends of the bars also are provided with axially aligned guide holes 78 which, when the bars are clamped together, are received upon guide pins 80 which project from a groove 82, see FIG. 4. Groove 82 is complementary to and receives one-half of the assembled clamping bars while supporting a complement of the pin units 70. Mold member 42 has a corresponding, complementary groove 84 therein to receive the other half of the clamping bar assembly. Said assembly is mounted upon the pins 80 quite readily when the mold members 42 and 44 are fully opened as illustrated in FIG. 2.

Though not illustrated in FIGS. 8–11, it will be seen from FIG. 15 that the clamping bars 62 and 64 may be secured readily in clamped condition by means of a clamping bolt 86, which is illustrated as being of the Allen-type, the same being swivelly mounted within a suitable hole in each of the opposite ends of clamping bar 64. Intermediately of the ends of the bolts 86, they are undercut to receive a retaining screw 88 so that the bolts 86 may be rotated with respect to but will not become separated from bar 64. The threaded end of the bolts 86 are received in complementary threaded bores in the clamping bar 62.

The inner faces of the mold members 42 and 44 are shown on a larger scale in FIGS. 5 and 6 than in the other figures. Referring to said figures, the mold blocks 48, illustrated in the upper portions of said figures, are complementary to each other. These contain mold cavities 90 which cooperate with the partial mold cavities 69 formed along one edge of each of clamping bars 62 and 64, as described above, to form the reinforcing end members 14 upon the pins 10. Complementary entrance sprue grooves 92, which are formed in each of the mold blocks 48, respectively enter runner channels 94 in said mold blocks which are gated respectively to the mold cavities 90. Additional runner grooves 96 extend from the runner channels 94 for cooperation with aligned runner grooves 98 of a complementary nature and respectively formed in the clamping bars 62 and 64 as clearly shown in FIGS. 8 and 9.

When the assembled clamping bar unit 62–64 is disposed within the grooves 82 and 84 and the molds are closed, the runner grooves 98 in the clamping bar assembly will terminate at the lower ends thereof in small gate head cavities 100 formed in mold block 49, the same being gated respectively into the head-forming cavities 54 as clearly shown in FIGS. 5 and 6. Hence, it will be seen that a relatively simple and direct runner and gate system is provided for the entire mold assembly and to facilitate the distribution of the fluid plastic material within the head-forming cavities 54, it will be seen that the heaviest body portions of the heads are disposed adjacent each other so as to simultaneously be gated from the cavities 100, said material initially flowing around the ends 72 of the back legs of the pin units 70 as can be visualized from FIG. 12. Suitable, conventional cooling means for the molds, not illustrated, for circulating cooling fluids, may also be included therein.

Referring to FIGS. 5, 6 and 16, for purposes of permitting the projection of the mold inserts 52 into the head-forming cavities 54 of lower mold blocks 49, said mold blocks are provided with additional channels 102 respectively complementary in cross-section to one-half of the mold inserts 52 which, as described above, are of typical key-hole shape in cross-section, as is readily apparent from FIG. 16. As indicated above, the mold inserts 52 also are supported by supporting member 50 but, to facilitate the connection of the inserts to said member, it is preferred that the inserts actually are directly mounted at one end within an auxiliary clamping plate 104 which may be secured by any suitable means, such as appropriate screws or the like, directly to the upper face of supporting member 50 as viewed in FIG. 6.

According to the preferred method of operating the mold apparatus comprising the present invention, there preferably is a substantial number of pairs of the clamping bars 62 and 64 provided and a group of operators initially load pairs of the same with full complements of the U-shaped pin units 70 which have been pre-shaped on additional equipment and the pointed end of the pin legs 18 have previously been suitably sharpened so that no further sharpening is required. When the mold members 42 and 44 have been opened to the initial position shown in FIG. 2, a set of the clamping bars 62, 64, with the complement of pin units 70 therein, is mounted upon the guide pins 80 in groove 82 and mold member 44 is moved toward mold member 42. Incident thereto, cam pins 58 engage cam holes 60 and cause elevation of supporting member 50 and results in the projection of mold inserts 52 through channels 102 into the head-forming cavity 54.

As best can be visualized from FIGS. 3–6, when the clamping bar unit 62–64 is disposed within the grooves 82 and 84, the side surface of said bars actually comprise part of the wall arrangement of the metal cavities 54 and 90. In this regard, the partial cavities 69 formed in one edge of each of the clamping bars 62 and 64 form an irregular wall configuration to provide a bracing projection 106 on the reinforcing end member 14 of the pin 10, while the opposite edge surfaces of the clamping bars 62 and 64 form the inner end faces of the head 12 of the pin.

In projecting the mold inserts 52 into the cavities 54, they are extended into engagement with the nearest edge surfaces of the clamping bar assembly 62–64 and thus the end portions of the sides of said mold inserts 52 actually form the flared walls of channel 22 of the head 12 of the pin as well as the constricting portions 24. The ends of the mold inserts 52 also are drilled within the cylindrical portion 108, as shown in FIG. 16a, to provide a small hole 110 sufficiently long to receive the pointed ends of the pin legs 18 of the pin units 70. By such arrangement, when the mold is opened by moving movable mold member 44 away from mold member 42, the cam pins 58 within mold 60 will operate initially to lower the supporting member 50 and thus withdraw the mold inserts 52 from the heads 12 of the finished pins which will result in the pointed ends of the pin legs being disposed in fully latched position within the innermost depth of the channel 22 of said head, thereby automatically producing completely finished and latched safety pin products.

While the invention has been described and illustrated in its several preferred embodiments, it should be understood that the invention is not to be limited to the precise details herein illustrated and described since the same may be carried out in other ways falling within the scope of the invention as claimed.

I claim:

1. A mold apparatus for the locking head of a safety pin having a channel receiving the pointed end of the pin when the pin is in fully closed position, said mold comprising a pair of mold members having complementary mold cavities respectively to form the exterior surfaces of said locking head, means to support a U-shaped metallic pin unit comprising a pointed pin leg and a back leg with the outer ends exposed for reception within one end of said mold cavities, and a longitudinal mold insert member mounted for movement into the opposite end of each of said mold cavities and substantially to said one end thereof adjacent the pointed end of said pin unit to form said channel which receives the pointed end of said pin leg when said pin is closed.

2. The mold apparatus for the locking head of a safety pin according to claim 1 in which said insert has a hole extending longitudinally thereinto aligned with the pointed pin leg of said pin unit and operable to receive the same when the mold assembly is closed and the mold insert has been fully projected thereinto, whereby injected plastic material flows around said insert to form said channel in said pin and upon removal from said mold said completed pin having the pointed end thereof disposed automatically in said channel.

3. The mold apparatus for the locking head of a safety pin according to claim 2 in which each of said mold inserts has a keyhole shape in cross-section operable to form flared entrance sides in the channel formed thereby and also provide a constricted entrance to the innermost retaining portion of said channel.

4. The mold apparatus for the locking head of a safety pin according to claim 1 in which said supporting means for said pin units have a surface arranged to form one end of the mold cavity when the mold members are closed and said supporting means for said pin units are arranged therewith for injection of the plastic material into said cavities.

5. The mold apparatus for the locking head of a safety pin according to claim 4 in which said supporting means for said pin units comprise a pair of bars and said mold members having complementary grooves on the inner faces thereof to receive said bars and accommodate the same when said mold members are closed upon each other.

6. The mold apparatus for the locking head of a safety pin according to claim 1 further including means to commonly support said insert members for unitary movement, and means on at least one mold member interengageable with said supporting means for said insert members when said molds are being opened and closed and respectively operable to retract and project said insert members into said mold cavities.

7. The mold apparatus for the locking heads of safety pins according to claim 1 in which said mold members each have rows of complementary recesses to form said locking heads and additional rows of complementary cavities spaced from said first mentioned rows and shaped to form molded reinforcing end members surrounding the bight portions of said U-shaped pin units, said support means for said pin units being complementary elongated bars, said mold members having runner grooves between the cavities of said rows thereof, the runner grooves in said elongated supporting bars extending across said bars and cooperative to form runners between said rows of mold cavities in said mold members.

8. The mold apparatus for the locking heads of safety pins according to claim 7 in which said mold members have a primary runner extending along one side thereof adjacent said row of cavities to form said reinforcing end members and also having gates from said primary runner to said cavities, and said insert members being mounted commonly upon a support bar movable toward and from the opposite side of said mold members for projection of the insert members into said head-forming cavities.

References Cited

UNITED STATES PATENTS

| | | | |
|---|---|---|---|
| 1,465,775 | 8/1923 | Bernstein | 249—91 |
| 2,222,755 | 11/1940 | Watson | 18—36 |
| 2,425,832 | 8/1947 | Lubbert et al. | 18—36 |
| 2,506,966 | 5/1950 | Morin et al. | 18 |
| 2,698,461 | 1/1955 | Franz | 249—97 |
| 2,946,093 | 7/1960 | Everett | 249—94 |
| 3,328,846 | 7/1967 | Morin | 18—36 |
| 3,287,483 | 11/1966 | Morin | 18—36 X |

FOREIGN PATENTS 1,130,496  10/1956  France.

J. HOWARD FLINT, JR., *Primary Examiner.*